(12) United States Patent
Yamane et al.

(10) Patent No.: US 8,184,401 B2
(45) Date of Patent: May 22, 2012

(54) DISK DRIVE HEAD AND SUSPENSION ASSEMBLY HAVING A SLIDER WITH A GROOVE AND A CONNECTING STEP

(75) Inventors: Masami Yamane, Kawasaki (JP); Kan Takahashi, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 336 days.

(21) Appl. No.: 12/548,285

(22) Filed: Aug. 26, 2009

(65) Prior Publication Data

US 2010/0002340 A1 Jan. 7, 2010

Related U.S. Application Data

(63) Continuation of application No. PCT/JP2008/066029, filed on Aug. 29, 2008.

(30) Foreign Application Priority Data

Dec. 27, 2007 (JP) ................................. 2007-338214

(51) Int. Cl.
G11B 5/60 (2006.01)
(52) U.S. Cl. ............... 360/235.7; 360/235.6; 360/235.8; 360/236.3
(58) Field of Classification Search .................. 360/237, 360/235.4, 235.5, 235.6, 235.7, 235.8, 235.9, 360/236, 236.1, 236.2, 236.3, 236.4, 236.5, 360/236.6, 236.7, 236.8, 236.9
See application file for complete search history.

(56) References Cited

U.S. PATENT DOCUMENTS

| | | | | |
|---|---|---|---|---|
| 6,639,755 B2 | | 10/2003 | Boutaghou et al. | |
| 7,230,797 B1 * | | 6/2007 | Liu | 360/235.8 |
| 7,477,486 B1 * | | 1/2009 | Sun et al. | 360/236.3 |
| 7,679,863 B2 * | | 3/2010 | Hashimoto et al. | 360/235.7 |
| 7,940,497 B2 * | | 5/2011 | Kondo et al. | 360/235.7 |
| 2004/0150916 A1 * | | 8/2004 | Rao et al. | 360/235.8 |
| 2004/0201923 A1 * | | 10/2004 | Rao et al. | 360/235.7 |
| 2006/0092570 A1 * | | 5/2006 | Payne et al. | 360/236.5 |
| 2006/0268460 A1 * | | 11/2006 | Kondo | 360/235.8 |

(Continued)

FOREIGN PATENT DOCUMENTS

JP H10-283622 A 10/1998

(Continued)

OTHER PUBLICATIONS

Explanation of Non-English Language Reference(s).

*Primary Examiner* — Jefferson Evans
(74) *Attorney, Agent, or Firm* — Knobbe, Martens, Olson & Bear LLP

(57) ABSTRACT

According to an embodiment, a slider of a head includes a negative-pressure cavity defined by a recess formed in a disk-facing surface, a leading step portion which is situated on an upstream side of the negative-pressure cavity with respect to an airflow and projects from a bottom surface of the negative-pressure cavity, a trailing step portion which is provided on an outflow-side end portion of the facing surface on the downstream side of the negative-pressure cavity with respect to the airflow, projects from the bottom surface of the negative-pressure cavity, and constitutes a part of the facing surface, and a maximum-positive-pressure producing step portion which is spaced upstream from the trailing step portion with respect to the airflow, projects from the bottom surface of the negative-pressure cavity, and produces a maximum positive pressure. A head portion is provided on the trailing step portion.

9 Claims, 10 Drawing Sheets

U.S. PATENT DOCUMENTS

| | | | |
|---|---|---|---|
| 2007/0047143 A1 | 3/2007 | Matsumoto | |
| 2007/0121251 A1* | 5/2007 | Yoshida | 360/236.3 |
| 2007/0206327 A1* | 9/2007 | Kameyama | 360/236.3 |
| 2007/0230050 A1* | 10/2007 | Ruiz | 360/128 |
| 2009/0059432 A1* | 3/2009 | Kubotera et al. | 360/236.6 |
| 2011/0157748 A1* | 6/2011 | Hanyu | 360/235.4 |

FOREIGN PATENT DOCUMENTS

| | | |
|---|---|---|
| JP | 2005-050482 A | 2/2005 |
| JP | 2005-228362 A | 8/2005 |
| JP | 2006-209952 A | 8/2006 |
| JP | 2006-331532 A | 12/2006 |
| JP | 2007-066457 A | 3/2007 |
| WO | WO 01/41141 | 6/2001 |

* cited by examiner

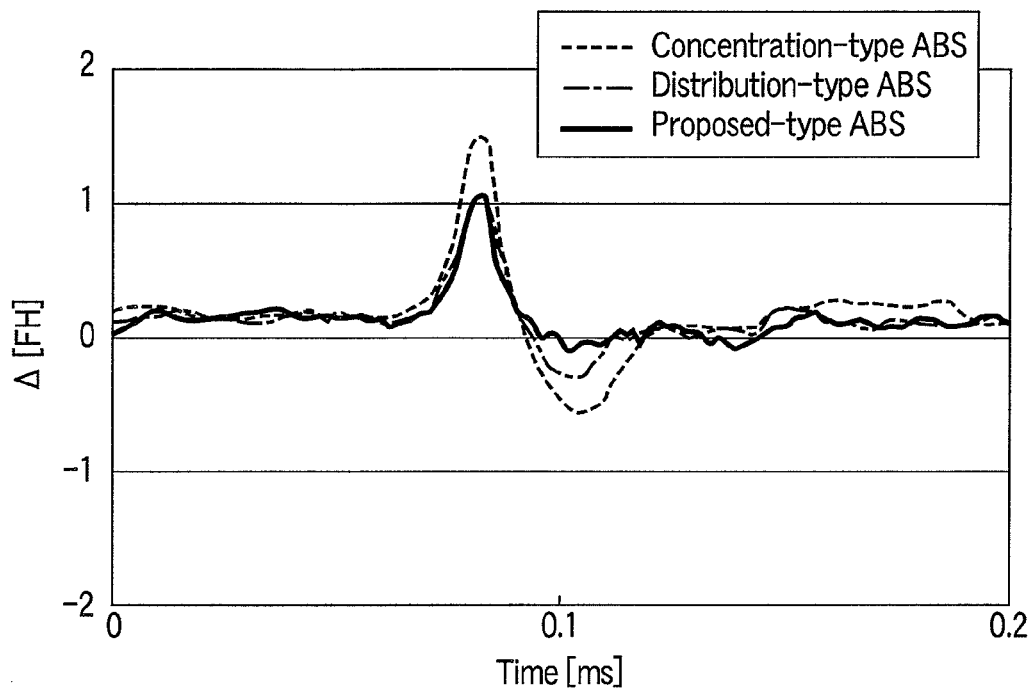
F I G. 13
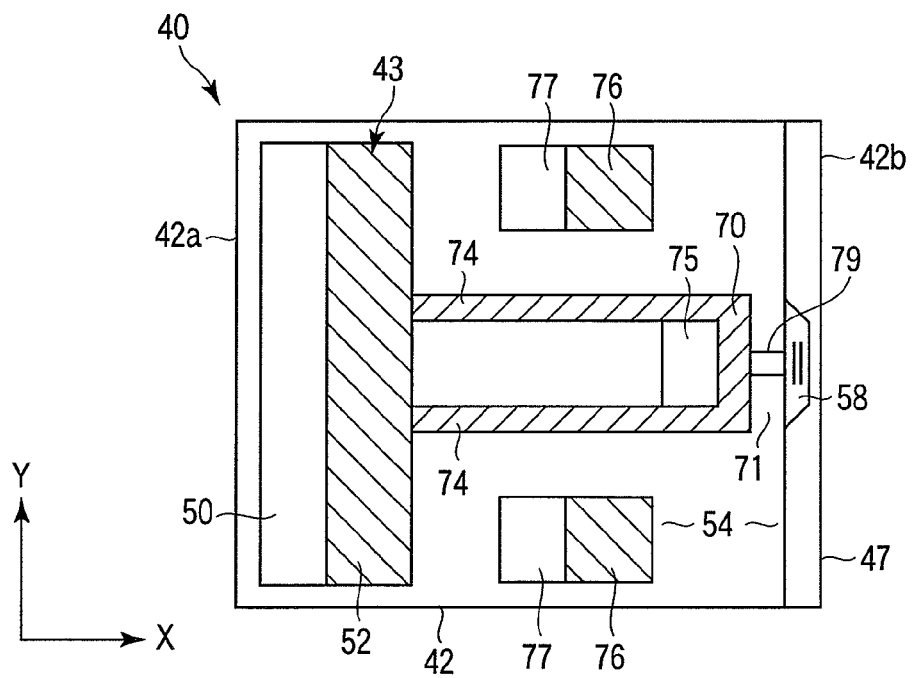
F I G. 14

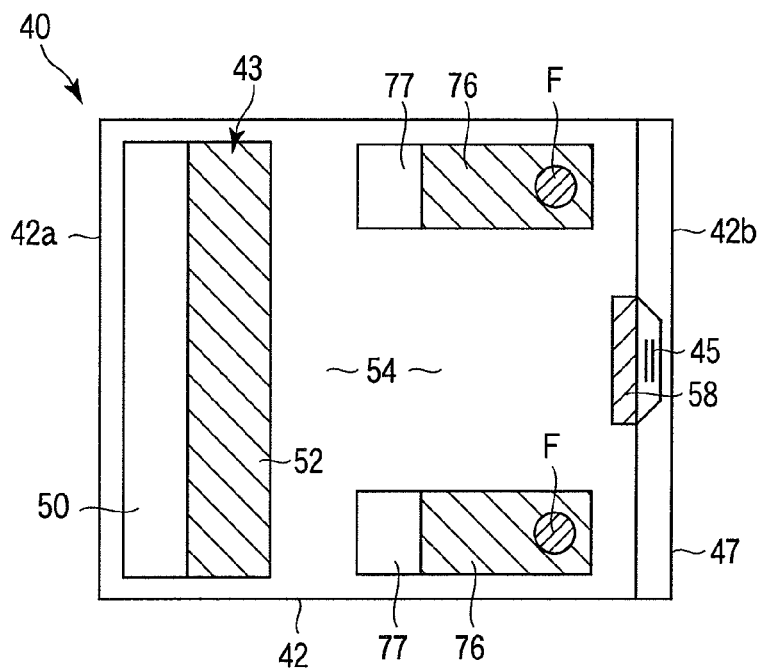
F I G. 15
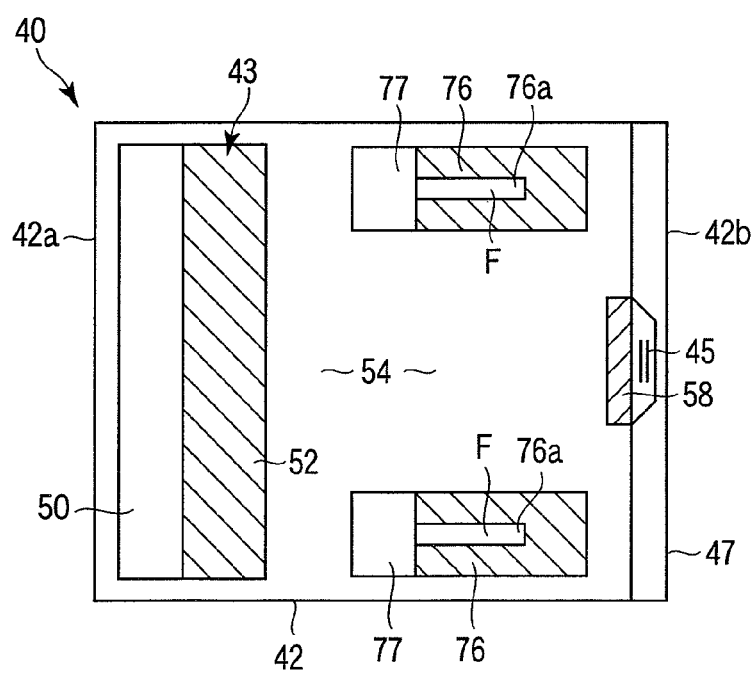
F I G. 16

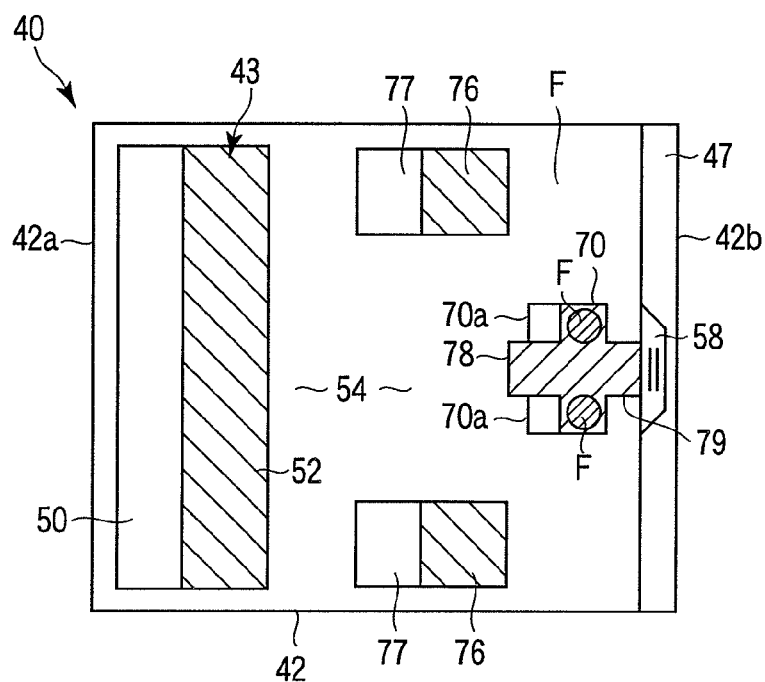
F I G. 17
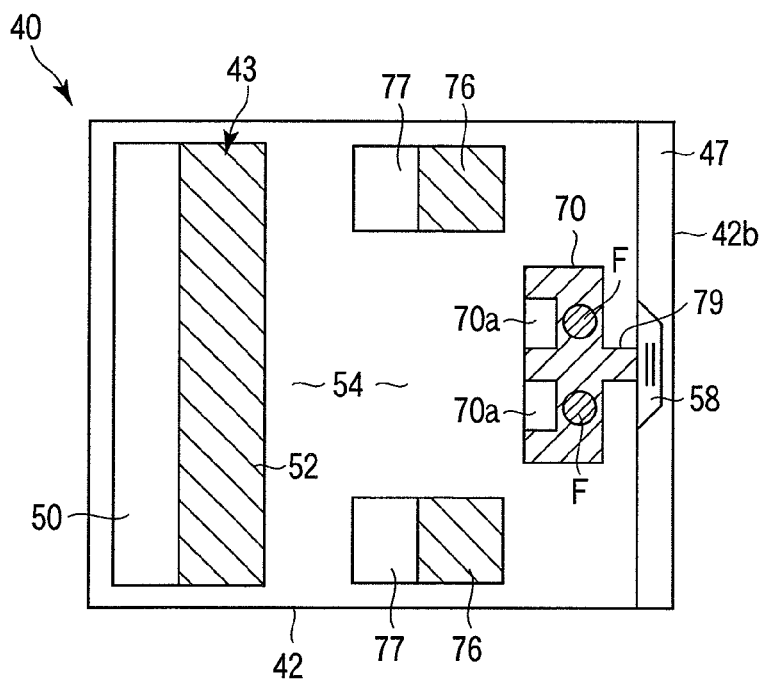
F I G. 18

DISK DRIVE HEAD AND SUSPENSION ASSEMBLY HAVING A SLIDER WITH A GROOVE AND A CONNECTING STEP

CROSS-REFERENCE TO RELATED APPLICATIONS

This is a Continuation Application of PCT Application No. PCT/JP2008/066029, filed Aug. 29, 2008, which was published under PCT Article 21(2) in Japanese.

This application is based upon and claims the benefit of priority from Japanese Patent Application No. 2007-338214, filed Dec. 27, 2007, the entire contents of which are incorporated herein by reference.

BACKGROUND

1. Field

One embodiment of the present invention relates to a head used in a disk drive device provided with a disk recording medium based on the discrete track recording technique, a head suspension assembly provided with the head, and a disk drive device provided with the head suspension assembly.

2. Description of the Related Art

A disk drive device, e.g., a magnetic disk drive device, includes a magnetic disk disposed in a case, a spindle motor that supports and rotates the magnetic disk, a head that reads and writes information from and to the magnetic disk, and a carriage assembly that supports the head for movement with respect to the magnetic disk. The carriage assembly includes a rockably supported arm and a suspension extending from the arm, and the magnetic head is supported on an extended end of the suspension. The magnetic head includes a slider attached to the suspension and a head portion provided on the slider. The head portion is constructed including a reproducing element for reading and a recording element for writing.

The slider has a facing surface that is opposed to a recording surface of the magnetic disk. A predetermined head load directed toward a magnetic recording layer of the magnetic disk is applied to the slider by the suspension. When the magnetic disk drive device operates, an airflow is produced between the magnetic disk in rotation and the slider. Based on the principle of aerodynamic lubrication, a force (positive pressure) to fly the slider above the recording surface of the magnetic disk acts on the facing surface of the slider. By balancing this flying force with the head load, the slider is flown with a gap above the recording of the magnetic disk.

A magnetic disk of a discrete track recording (DTR) type has recently been proposed as a technique for improving the recording density of a magnetic disk drive device, as disclosed in Jpn. Pat. Appln. KOKAI Publication No. 10-283622, for example, and a development is being carried out for practical application. In a conventional magnetic disk, a magnetic recording layer is spread on a flat disk surface. On the other hand, the DTR magnetic disk is formed with a concave-convex surface, in which convex parts form magnetic recording tracks and concave parts form nonmagnetic grooves without magnetism. The convex parts are previously patterned to form a plurality of servo areas for servo data recording and data areas that enable a user to record data. Information is recorded or reproduced as a flying magnetic head traverses the concave-convex surface of the magnetic disk.

According to the DTR magnetic disk constructed in this manner, magnetic interaction between adjacent tracks is reduced by the nonmagnetic grooves, so that the recording capacity of the magnetic disk drive device can be increased. Since disk positioning reference signals (servo signals) can be formed as concave-convex patterns on the disk surface, there is an advantage that a servo write process is unnecessary.

In the data areas of the DTR magnetic disk described above, the convex tracks and the nonmagnetic grooves extend along the circumference of the disk, that is, along the moving direction of the head, and are alternately arranged radially of the disk. In the description to follow, the nonmagnetic grooves of the data areas will be referred to as "transverse grooves".

On the other hand, the servo areas of the DTR magnetic disk are each originally formed of a plurality of portions, including a preamble portion, an address mark portion, a burst portion, etc., and their concave-convex patterns are complicated. Only the preamble portion will now be described for the sake of simplicity. In the preamble portion, nonmagnetic grooves are formed radially of the disk, and these nonmagnetic grooves extend substantially at right angles to the transverse grooves of the data areas. In the description to follow, the nonmagnetic grooves of the servo areas will be referred to as "longitudinal grooves".

If the magnetic head slider flies above the disk that has those physical irregularities on its surface, a gap between the magnetic head slider and the disk changes depending on the irregularities of the disk surface. Thus, the flying height of the slider varies to compensate for the change of the gap.

If the disk surface is formed only of concave-convex configurations that, like the data areas, are based on a predetermined area ratio (land-groove ratio) between the concave and convex parts, the flying height variations of the slider are constant and unidirectional (flight reduction over a data surface). Therefore, no substantial problem arises if the slider flight is designed in previous consideration of the flying height variations.

Actually, however, the servo areas and the data areas are different in concave-convex configurations. If the slider passes their boundaries, therefore, the flight stability of the slider is impaired, and in the worst case, the reliability of the device is lowered considerably. If the flying height of the slider is reduced too much, in particular, the slider and the disk contact each other, so that data corruption or the like is caused to lower the reliability of the magnetic recording device, and this situation must be avoided.

Accordingly, the head that is combined with the DTR magnetic disk is expected to have a flight performance insensitive to change of irregularities that occurs when the head moves from the data areas to the servo areas and from the servo areas to the data areas.

In general, a slider is constructed so that a maximum positive pressure is produced at a trailing pad portion on its outflow end side on which recording and reproducing elements are disposed. If the pressure varies at boundaries between servo areas and data areas of a magnetic disk, in this case, it is difficult to suppress a reduction of the flying height of the slider.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 13 shows flight reductions of sliders of various types observed when the magnetic head traverses the data areas and the servo areas of the magnetic disk;

FIG. 14 is an exemplary plan view showing the disk-facing surface side of a magnetic head according to a second embodiment of this invention;

FIG. 15 is an exemplary plan view showing the disk-facing surface side of a magnetic head according to a third embodiment of this invention;

FIG. 16 is an exemplary plan view showing the disk-facing surface side of a magnetic head according to a fourth embodiment of this invention;

FIG. 17 is an exemplary plan view showing the disk-facing surface side of a magnetic head according to a fifth embodiment of this invention;

FIG. 18 is an exemplary plan view showing the disk-facing surface side of a magnetic head according to a sixth embodiment of this invention.

DETAILED DESCRIPTION

Various embodiments according to the invention will be described hereinafter with reference to the accompanying drawings. In general, according to one embodiment of the invention, there is provided a head which performs information processing for a rotatable recording medium including a disk substrate, a recording area formed of a concave-convex pattern circumferentially extending on a surface of the substrate, and a plurality of servo areas which are formed of concave-convex patterns individually radially extending on the surface of the substrate and to which servo data is recorded, the head comprising:

a slider including a facing surface opposed to a surface of the recording medium, and configured to be flown by an airflow which is produced between the recording medium surface and the facing surface as the recording medium rotates; and a head portion provided on the slider and configured to record and reproduce information to and from the recording medium, the facing surface of the slider having an inflow-side end and an outflow-side end for the airflow, a first axis extending between the inflow end and the outflow-side end in the direction of the airflow, and a second axis extending at right angles to the first axis, the slider comprising a negative-pressure cavity which is defined by a recess formed in the facing surface and produces a negative pressure, a leading step portion which is situated on an upstream side of the negative-pressure cavity with respect to the airflow, projects from a bottom surface of the negative-pressure cavity, and forms a part of the facing surface, a trailing step portion which is provided on the outflow-side end portion of the facing surface on an downstream side of the negative-pressure cavity with respect to the airflow, projects from the bottom surface of the negative-pressure cavity, and constitutes a part of the facing surface, and a maximum-positive-pressure producing step portion which is spaced upstream from the trailing step portion with respect to the airflow, projects from the bottom surface of the negative-pressure cavity, and produces a maximum positive pressure, the head portion being provided on the trailing step portion.

An embodiment in which a disk drive device according to this invention is applied to a hard disk drive (HDD) will now be described in detail with reference to the accompanying drawings.

Figure 1:
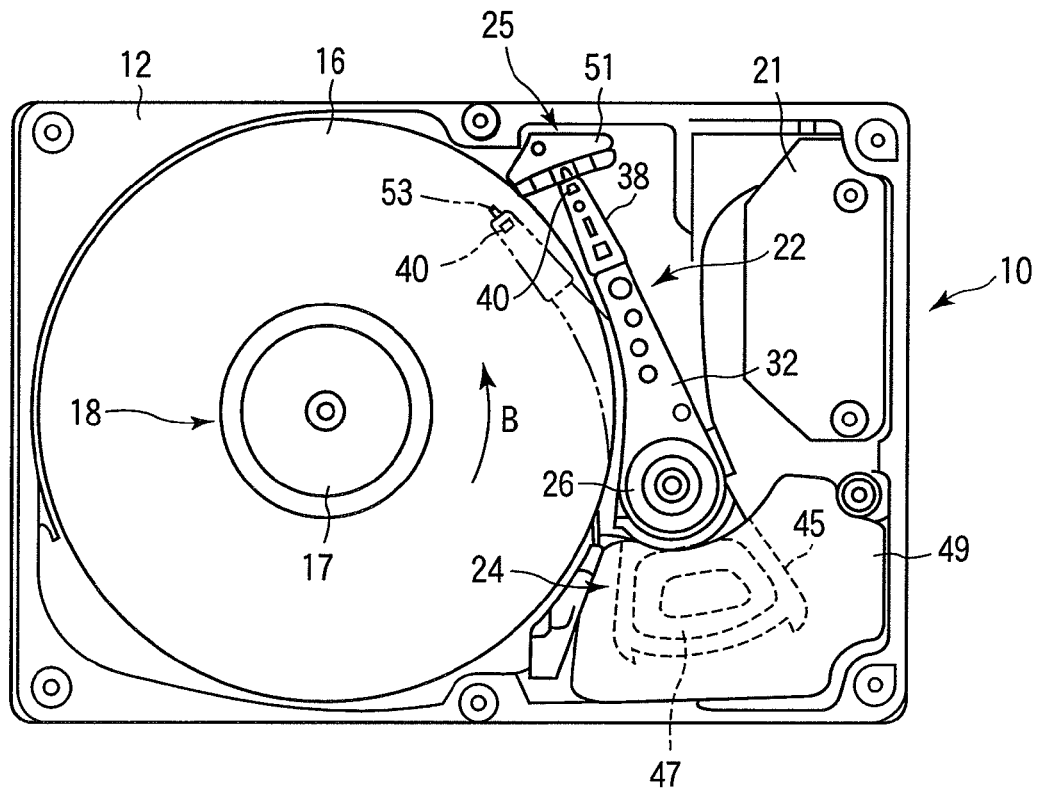
FIG. 1 is an exemplary plan view showing an HDD according to a first embodiment of this invention.

As shown in FIG. 1, the HDD includes a case 12 in the form of an open-topped rectangular box and a top cover (not shown). The top cover is fastened to the case by screws so as to close the top opening of the case.

The case 12 contains a DRT magnetic disk 16, spindle motor 18, magnetic heads 40, carriage assembly 22, voice coil motor (VCM) 24, ramp load mechanism 25, board unit 21, etc. The magnetic disk 16 serves as a recording medium. The spindle motor 18 serves as a drive section that supports and rotates the disk. The magnetic heads write and read information to and from the disk. The carriage assembly 22 supports the heads for movement with respect to the disk 16. The VCM 24 rotates and positions the carriage assembly. The ramp load mechanism 25 holds the magnetic heads in a retracted position at a distance from the magnetic disk when the heads are moved to the outermost periphery of the disk. The board unit 21 includes a head IC and the like.

A printed circuit board (not shown) is screwed to the outer surface of a bottom wall of the case 12. The circuit board controls the operations of the spindle motor 18, VCM 24, and magnetic heads through the board unit 21.

Figure 3:
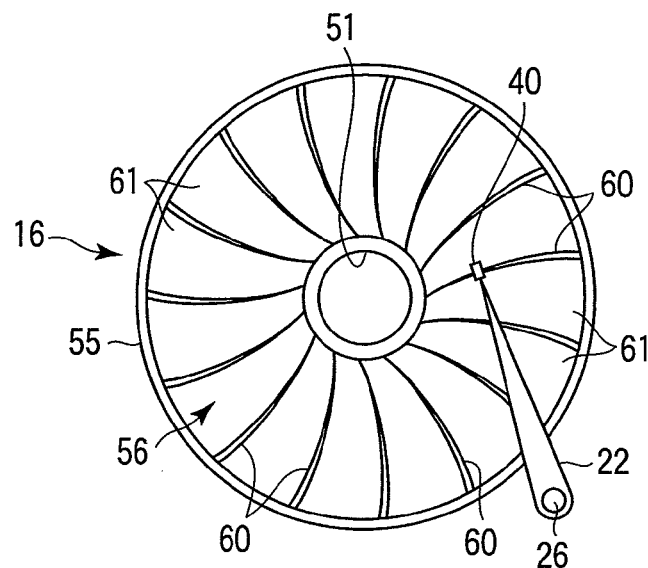
FIG. 3 is an exemplary plan view showing a magnetic disk.
Figure 4:
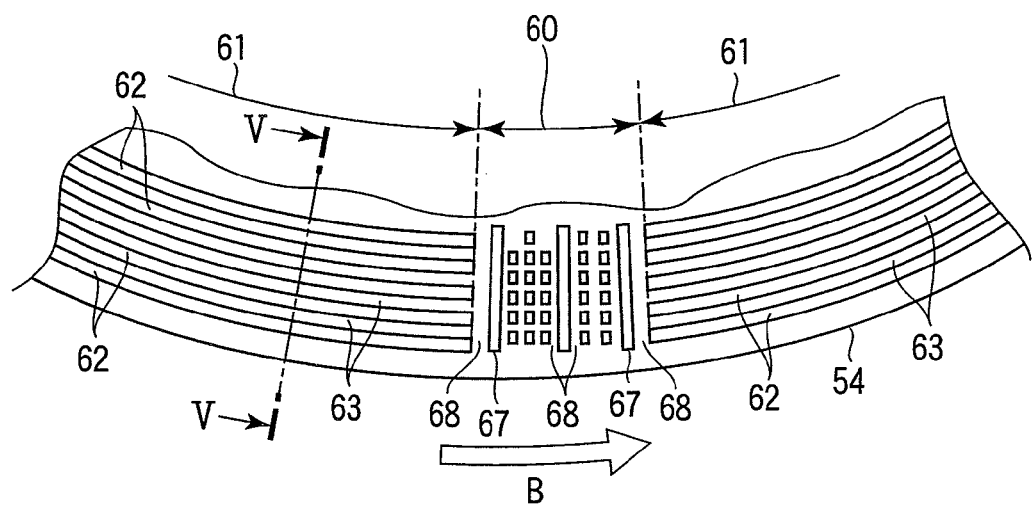
FIG. 4 is an exemplary enlarged plan view schematically showing a part of the magnetic disk.
Figure 5:
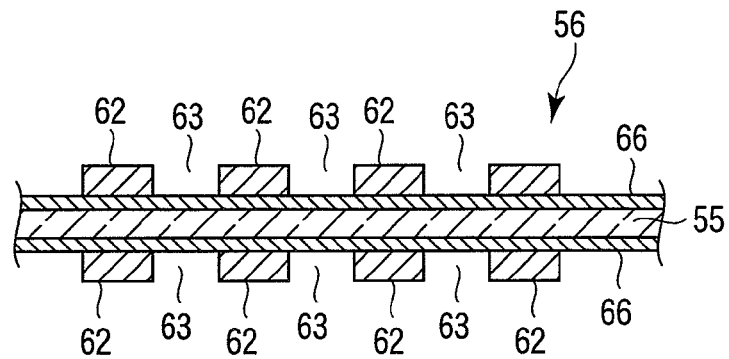
FIG. 5 is an exemplary sectional view of the magnetic disk taken along line V-V of FIG. 4.

As shown in FIGS. 3, 4 and 5, the magnetic disk 16 is provided with a flat disk substrate 55, having a center hole 51, and a recording layer 56 formed on at least one surface of the substrate, e.g., on either of the obverse and reverse surfaces of the substrate in this case. The recording layer 56 that constitutes a recording region is formed in a ring that is coaxial with the substrate 55 except for the inner edge portion and the outer edge portion of the substrate. The magnetic disk 16 is formed as a DTR medium, and the recording layer 56 is formed in the shape of a concave-convex pattern using a ferromagnetic material, e.g., CoCrPt. The concave-convex pattern of the recording layer 56 roughly includes a data area pattern 61 and a plurality of servo area patterns 60.

The substrate 55 is formed of, for example, glass, and a soft underlayer (SUL) 66 is formed on each of its obverse and reverse surfaces. The substrate 55 may alternatively be formed of aluminum in place of glass. The data area pattern 61 and the servo area patterns 60 of the recording layer 56 are formed superposed on the underlayer 66.

The data area pattern 61 forms a recording region to and from which user data is recorded and reproduced by the magnetic head 40 of the HDD, and is composed of a projection of a magnetic material on the surface of the substrate 55. Specifically, the data area pattern 61 includes a plurality of magnetic tracks 62 that are each in the form of a circular ring-shaped projection of a ferromagnetic material (CoCrPt) and function as recording layers. These magnetic tracks 62 extend along the circumference of the substrate 55 and are arranged at regular cycles, that is, at regular track pitches, in the radial direction of the substrate 55.

Each two radially adjacent magnetic tracks 62 are divided by a nonmagnetic groove (transverse groove) 63 formed of a recess that cannot record data. Each nonmagnetic groove 63 extends along the circumference of the substrate 55. A surface of the magnetic disk is formed with a diamond-like carbon protective film, a thin film (not shown), and in addition, is coated with a lube as a lubricant.

As shown in FIGS. 3 and 4, the circular ring-shaped magnetic tracks 62 that constitute the data area pattern 61 are divided into sectors along the circumference of the substrate 55 by the plurality of servo area patterns 60. Each servo area pattern 60 is a magnetic/nonmagnetic pre-bit area in which required information for positioning the head of the magnetic disk device is embedded. Each servo area pattern 60 substantially radially extends from near the center hole 51 of the substrate 55 to the outer edge portion thereof and is formed in a circular arc coincident with the trajectory of the head.

Each servo area pattern 60 includes a plurality of servo tracks 67 that are formed to be projections of a ferromagnetic material that individually extend radially of the substrate 55 and function as recording layers. Each two circumferentially adjacent servo tracks 67 are divided by a plurality of nonmagnetic grooves (longitudinal grooves) 68 each formed of a recess. These nonmagnetic grooves 68 extend radially of the substrate 55.

As shown in FIG. 1, the disk 16 is fitted on a hub (not shown) of the spindle motor 18 and fixed on the hub by a clamp spring 17. If the motor 18 is driven, the disk 16 is rotated at a predetermined speed of, for example, 4,200 rpm in the direction of arrow B.

The carriage assembly 22 is provided with a bearing portion 26, which is fixed to the bottom wall of the case 12, and arms 32 that extend from the bearing portion. The arms 32 are situated parallel to the surfaces of the magnetic disk 16 and spaced from one another. They extend in the same direction from the bearing portion 26. The carriage assembly 22 is provided with suspensions 38 that are elastically deformable elongated plates. Each suspension 38 is formed of a leaf spring, of which the proximal end is fixed to the distal end of its corresponding arm 32 by spot welding or adhesive bonding and which extends from the arm. Alternatively, each suspension may be formed integrally with its corresponding arm 32. The arm 32 and the suspension 38 constitute a head suspension, and the head suspension and the magnetic heads 40 constitute a head suspension assembly.

Figure 2:
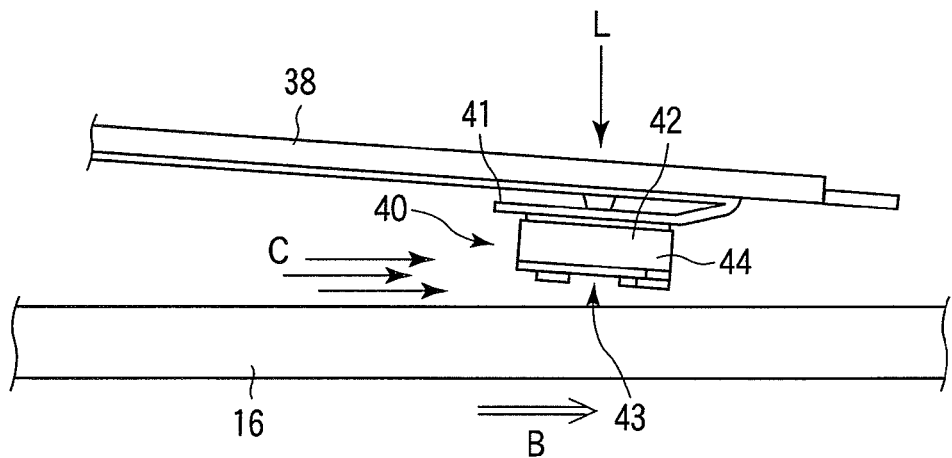
FIG. 2 is an exemplary enlarged side view showing a magnetic head portion of the HDD.

As shown in FIG. 2, each magnetic head 40 includes a slider 42 substantially in the shape of a rectangular parallelepiped and a recording/reproducing head portion 44 on the slider. It is fixed to a gimbal spring 41 that is provided on the distal end portion of each suspension 38. Each magnetic head 40 is subjected to a head load L that is directed to a surface of the magnetic disk 16 by the elasticity of the suspension 38.

As shown in FIG. 1, the carriage assembly 22 includes a support frame 45 that extends from the bearing portion 26 oppositely from the arms 32. The support frame supports a voice coil 47 that constitutes a part of the VCM 24. The support frame 45 is molded from plastic and formed integrally on the outer periphery of the voice coil 47. The voice coil 47 is situated between a pair of yokes 49 that are fixed on the case 12 and, in conjunction with these yokes and a magnet (not shown) fixed to one of the yokes, constitutes the VCM 24. If the voice coil 47 is energized, the carriage assembly 22 rotates around the bearing portion 26, whereupon each magnetic head 40 is moved to and positioned in a region over a desired track of the magnetic disk 16.

The ramp load mechanism 25 includes a ramp 51 and tabs 53. The ramp 51 is provided on the bottom wall of the case 12 and located outside the magnetic disk 16. The tabs 53 extend individually from the respective distal ends of the suspensions 38. As the carriage assembly 22 rotates to its retracted position outside the magnetic disk 16, each tab 53 engages with a ramp surface on the ramp 51 and is then pulled up along the slope of the ramp surface, whereupon each magnetic head is unloaded.

Figure 6:
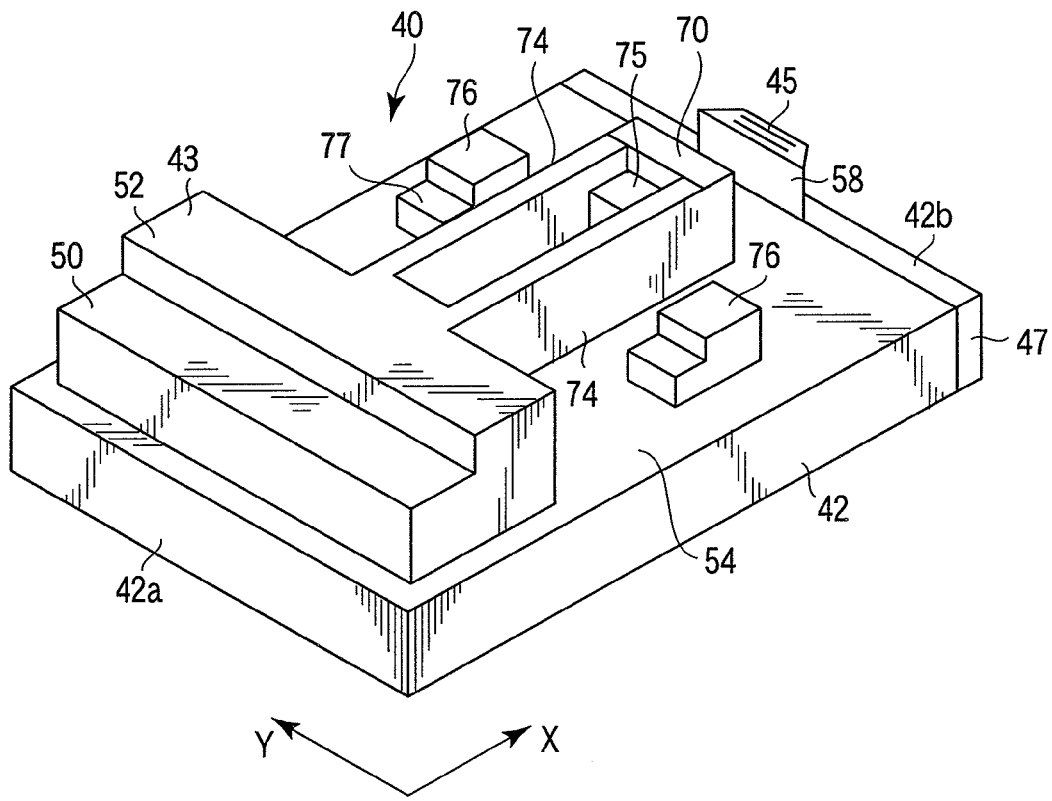
FIG. 6 is an exemplary perspective view showing the disk-facing surface side of a slider of the magnetic head.

The following is a detailed description of each magnetic head 40. FIG. 6 is a perspective view showing a disk-facing surface of the slider of the magnetic head, FIG. 7 is a plan view of the slider, and FIG. 8 is a sectional view of the slider.

Figure 7:
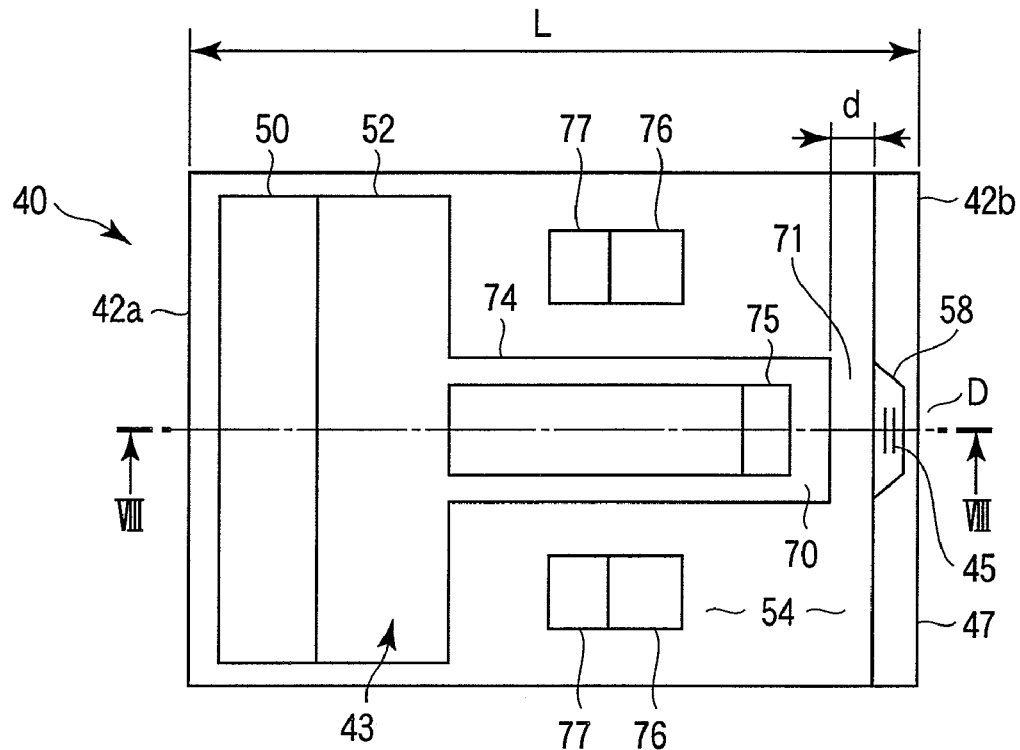
FIG. 7 is an exemplary plan view showing the disk-facing surface side of the slider.
Figure 8:
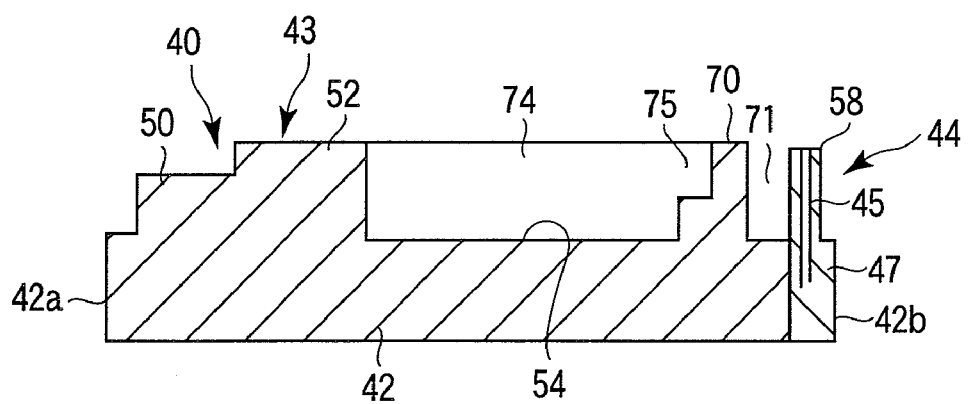
FIG. 8 is an exemplary sectional view taken along line VIII-VIII of FIG. 7.

As shown in FIGS. 6 to 8, the magnetic head 40 includes the slider 42 that is substantially in the shape of a rectangular parallelepiped. The slider has a rectangular disk-facing surface (air bearing surface (ABS)) 43, which faces a surface of the magnetic disk 16. The longitudinal direction of the disk-facing surface 43 is supposed to be a first direction X, and the transverse direction perpendicular thereto to be a second direction Y. The surface 43 has a central axis D that extends in the first direction X.

The slider 42 is formed as a so-called femto slider, having a length L of 1.25 mm or less, e.g., 0.85 mm, in the first direction X and a width W of 1.0 mm or less, e.g., 0.7 mm, in the second direction Y.

The magnetic head 40 is constructed as a flying head, in which the slider 42 is flown by an airflow C (see FIG. 2) that is generated between the disk surface and the disk-facing surface 43 as the magnetic disk 16 rotates. When the HDD is operating, the disk-facing surface 43 of the slider 42 never fails to be opposed to the disk surface with a gap therebetween. The direction of the airflow C is coincident with the direction of rotation B of the magnetic disk 16. The slider 42 is located so that the first direction X of the disk-facing surface 43 opposed to the surface of the disk 16 is substantially coincident with the direction of the airflow C.

The slider 42 has an inflow-side end 42a on the inflow side of the airflow C and an outflow-side end 42b on the outflow side of the airflow. The inflow-side end and the outflow-side end are spaced along a first axial direction X. Further, an element-forming layer 47 of alumina or the like is laminated to an outflow-side end surface of the slider 42 and forms a part of the slider.

A negative-pressure cavity 54 that is defined by a recess and configured to produce a negative pressure is formed in the central portion and the peripheral edge portion of the disk-facing surface 43. The disk-facing surface 43 is formed with a leading step portion 50 that is situated on the upstream side of the negative-pressure cavity 54 with respect to the airflow C. The leading step portion 50 projects above the bottom surface of the negative-pressure cavity 54, is situated at the inflow-side end 42a of the slider 42, and extends along a second axial direction Y. A rectangular leading pad 52 that extends in the second axial direction Y is formed on the leading step portion 50 and constitutes a part of the disk-facing surface 43.

On the downstream side of the negative-pressure cavity 54 with respect to the airflow C, a trailing step portion 58 is disposed at the outflow-side end portion of the disk-facing surface 43. The trailing step portion 58 is formed of the element-forming layer 47 and situated substantially in the center of the disk-facing surface 43 with respect to the second axial direction Y. It projects from the bottom surface of the negative-pressure cavity and constitutes a part of the disk-facing surface. The head portion 44 of the magnetic head 40 includes recording and reproducing elements 45 that record and reproduce information to and from the magnetic disk 16. The reproducing and recording elements 45 are embedded in the trailing step portion 58.

A maximum-positive-pressure producing step portion 70 is provided on the upstream side of the trailing step portion 58 with respect to the airflow C in a spaced relationship. The maximum-positive-pressure producing step portion 70 projects from the bottom surface of the negative-pressure cavity, and its top surface constitutes a part of the disk-facing surface 43. The maximum-positive-pressure producing step portion 70 is situated on a central axis D and has a substantially rectangular shape. A groove 71 that constitutes a part of the negative-pressure cavity 54 is formed between the maximum-positive-pressure producing step portion 70 and the trailing step portion 58. As shown in FIG. 7, the maximum-positive-pressure producing step portion 70 is spaced from the trailing step portion 58 toward the inflow end side by a distance d along the first axial direction X. If the length of the slider 42 along the first axial direction X is L, the distance d is set to 2 to 50% of L, e.g., to 25 μm.

Further, the slider 42 includes a pair of elongated center step portions 74 and a pair of sidestep portions 76. The center step portions 74 are situated individually on the opposite sides of the central axis, projects from the bottom surface of the negative-pressure cavity 54, and extend between the leading step portion 50 and the maximum-positive-pressure producing step portion 70. The sidestep portions 76 individually project from the bottom surface of the negative-pressure cavity on the opposite sides of the center step portions 74. The center step portions 74 extend along the first axial direction X.

The maximum-positive-pressure producing step portion 70 is formed with a recess 75 that is situated between the center step portions 74. This recess is situated on the inflow end side of the maximum-positive-pressure producing step portion 70. Further, each sidestep portion 76 is formed with a recess 77 that is situated on the inflow side. The respective top surfaces of the center step portions 74 and the sidestep portions 76 individually constitute parts of the disk-facing surface 43.

According to the HDD and the head suspension assembly constructed in this manner, the magnetic head 40 is flown by the airflow C that is produced between the disk surface and the disk-facing surface 43 as the magnetic disk 16 rotates. When the HDD is operating, therefore, the disk-facing surface 43 of the slider 42 never fails to be opposed to the disk surface with a gap therebetween. As shown in FIG. 2, the magnetic head 40 flies in an inclined posture such that the trailing step portion 58 situated at the outflow-side end 42b of the slider 42 and formed with the head portion 44 is located closest to the disk surface. In the slider 42, moreover, a maximum positive pressure is produced in the position of the maximum-positive-pressure producing step portion 70. Since the pressure producing step portion 70 is spaced from the trailing step portion 58 toward the inflow-side end 42a, it can suppress a reduction of the flying height of the slider 42 above the magnetic disk surface.

The following is a description of a mechanism for suppressing the reduction of the flying height of the slider 42.

In the case where the magnetic head traverses the surface of the DTR magnetic disk in a flying state, as mentioned before, the flying height is easily caused to vary by pressure variations when the magnetic head passes boundaries between the data and servo areas of the disk, since the concave-convex pattern varies between these areas.

Figure 9:
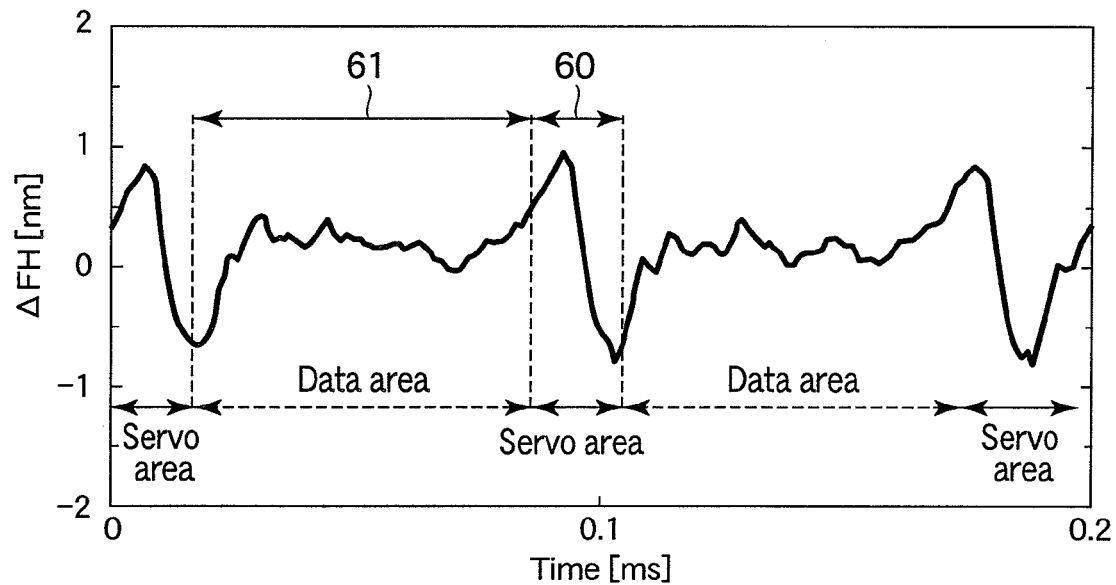
FIG. 9 is an exemplary diagram showing flying height variations observed when the magnetic head traverses data areas and servo areas of the magnetic disk.

FIG. 9 shows the result of measurement of flying height variations at the outflow-side end (near the recording and reproducing elements) of the slider that flies above the DTR magnetic disk. The slider that flies above the DTR magnetic disk can maintain a constant flying height as it flies over each data area 61. Over each servo area 60, however, the slider is liable to a fly variation such that its flying height temporarily increases and then decreases as it passes there.

This fly variation is attributable to a pressure change on the disk-facing surface, which is caused at the boundaries between the data and servo areas, and cannot be avoided as long as the DTR magnetic disk has a concave-convex shape.

However, the fly variation of the slider should be minimized, since the signal recording and reproducing capacity of the magnetic head is reduced if the flying height is too great and that the slider and the disk are inevitably brought into contact with each other if the flying height is too small.

Figure 10:
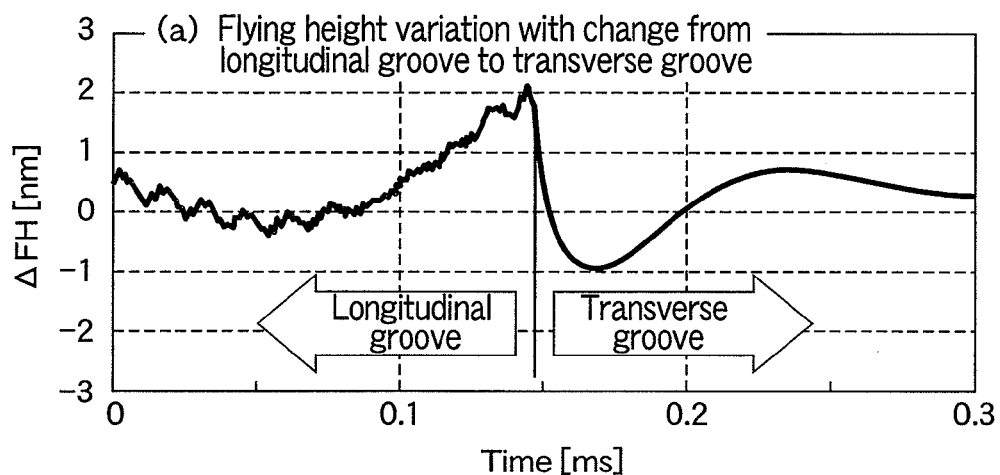
FIG. 10 is an exemplary diagram showing flying height variations observed when the magnetic head traverses the data areas and the servo areas of the magnetic disk.
Figure 11:
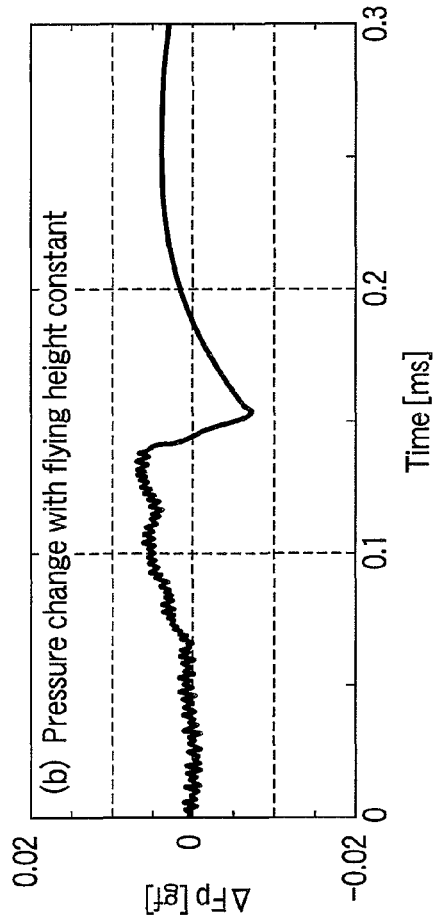
FIG. 11 is an exemplary diagram showing pressure variations observed when the magnetic head traverses the data areas and the servo areas of the magnetic disk.
Figure 12:
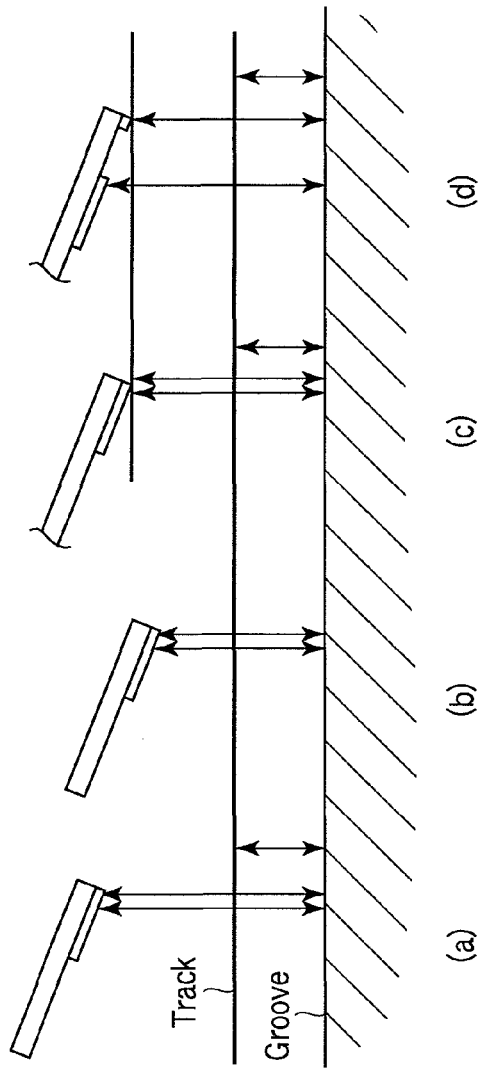
FIG. 12 is an exemplary diagram schematically showing the relationship between sliders and the pressure center height.

FIG. 10 shows a result example of analysis on the flying height variations of the slider that flies over the DTR magnetic disk. In this analysis, each data area and each servo area of the magnetic disk are simplified as a "transverse groove" and a "longitudinal groove", respectively, and changes of the flying height of the slider that flies over the grooves are dynamically calculated using a fluid analysis program. FIG. 11 represents a flying height change of the slider that passes a boundary between a "transverse groove" portion indicative of the data area and a "longitudinal groove" portion indicative of the servo area, and FIG. 12 show pressure changes observed when the slider that passes the boundary. Since data shown in FIG. 11 indicates only the pressure change during the passage of the boundary, however, the flying height of the slider is constant.

As seen from the flying height variation shown in FIG. 10, the slider behaves in such a manner that it temporarily flies at the boundary between the data area and the servo area and then its flight falls. As seen from FIG. 11, moreover, the pressure increases as the flying height of the slider increases and is reduced when the flight is reduced.

The following is a consideration of the slider behavior and the pressure changes.

First, when the slider moves from the data area to the servo area, air that exists between the disk-facing surface of the slider and the disk surface moves together with the slider along the "transverse groove" that is located parallel to its direction of travel as the slider flies over the data area. When the slider then reaches a position over the servo area, each groove of the magnetic disk becomes the "longitudinal groove" that is substantially perpendicular to the direction of travel of the slider, so that air having so far been flowing along each transverse groove is forced to move only in the direction to push up the slider. Thus, the flying height of the slider is supposed to increase.

When the slider moves from the servo area to the data area, on the other hand, little air moves together with the slider because the groove extends substantially at right angles to the direction of travel of the slider in the servo area. If the slider reaches the data area, the groove is a transverse groove that extends along the direction of travel, so that air flows at a stroke. Thereupon, the pressure is reduced, so that the slider is supposed to fall down.

Thus, in order to lessen the reduction of the flight of the slider, it is essential to suppress a reduction of pressure at the time of transition from the servo area to the data area.

The following is a description of an influence of the flying height of that part of the disk-facing surface (ABS) of the slider which produces the pressure to settle the flying height on the reduction of the flight of the slider.

The flying height of the part that produces the pressure to settle the flying height described herein is that of that step portion of the disk-facing surface which produces the highest positive pressure. In the description to follow, the flying height of this portion will be referred to as "pressure-center flying height".

The most influential element that determines the pressure produced on the disk-facing surface of the slider is "flying clearance". As shown (a) in FIG. 12, therefore, a slider with a large pressure-center flying height produces a low pressure on the disk-facing surface. As shown (b) in FIG. 12, on the other hand, a slider with a small pressure-center flying height produces a high pressure.

This indicates that the aforesaid reduction of the flight can be lessened by increasing the pressure-center flying height in consideration of the fact that the lower a pressure produced at the center of pressure, the smaller the variation of the pressure that causes the flight reduction is.

(c) and (d) in FIG. 12 are diagrams schematically showing two magnetic heads that fly over DTR magnetic disks with the same irregularity depth. Although these magnetic heads are equal in the flying height of the recording and reproducing elements, they are different in the pressure-center flying height. (c) in FIG. 12 shows a slider as a comparative example of which a maximum-positive-pressure producing position (pressure-center position) is set corresponding to the position of the recording and reproducing elements. (d) in FIG. 12 shows a slider that, like the aforementioned slider according to the present embodiment, is configured so that the maximum-positive-pressure producing position is separated from the recording and reproducing elements toward the inflow end side.

If the pressure-center flying height of the slider according to the present embodiment shown by (d) in FIG. 12, compared with the slider of the comparative example shown by (c) in FIG. 12, is shifted toward the inflow end side, the pressure change that causes the flight reduction for the aforesaid reason can be suppressed. In consequence, the flight reduction can be suppressed.

Further, possible sliders include a dispersed-pressure slider of which pressure-center producing parts that influence the flight reduction are distributed relatively widely and a concentrated-pressure slider of which pressure-center producing parts are minimized in area. Furthermore, there may be supposed a forwardly-concentrated-pressure slider, such as the one according to the present embodiment, in which the pressure is intensively produced in a small area and the center of pressure is set at the outflow-side end portion of the slider.

FIG. 13 shows the result of measurement of flight reductions at the boundaries between the data and servo areas observed when the sliders of the aforesaid three types are flown over the DTR magnetic disks. As seen from this drawing, the amount of the flight reduction decreases in the order of the dispersed-pressure type, concentrated-pressure type, and forwardly-concentrated-pressure type.

In a so-called channel type of which the slider performance is improved by concentrating the pressure to enhance the air efficiency, therefore, the flight reduction inevitably increases despite the good performance. In the case of the conventional dispersed-pressure slider, moreover, although the flight reduction is somewhat small, the flying height stability is lower than that of the channel-type slider. Thus, in the forwardly-concentrated-pressure slider, as in the present embodiment, the pressure is concentrated, and the pressure center is shifted from the outflow-side end of the slider, that is, the position of the recording and reproducing elements, toward the inflow end side. By doing this, the flight reduction can be reduced to make the slider well-balanced as a whole. As in the present embodiment, the flight reduction of the slider that passes the boundaries between the data and servo areas of the magnetic disk can be reduced by 30 to 40% by forming the maximum-positive-pressure producing step portion so that it is spaced from the trailing step portion toward the inflow end side by a distance of 25 μm.

Means for improving the flight stability is not limited to pressure concentration or modification of the step portion on the outflow end side, but may be various other methods, including intake of air through an inflow-end pad, securing of rigidity at the sidestep portions, etc.

A so-called island-type slider is proposed such that maximum-pressure producing positions are separated from the recording and reproducing elements. In this case, pads are arranged around the recording and reproducing elements. The maximum-pressure producing positions for this case are situated individually on the left and right of the recording and reproducing elements, and the maximum-pressure producing positions cannot be shifted to the upstream side. According to the present embodiment, moreover, the grooves are provided on the upstream portion of the recording and reproducing elements, and in addition, a distance is defined such that the maximum-pressure producing positions are separated upstream from the recording and reproducing elements.

According to the HDD of the present embodiment, as described above, the variations of the flying height of the magnetic head can be suppressed, and the flight reduction of the magnetic head, in particular, can be reduced as the magnetic disk passes the boundaries between the data and servo areas of the magnetic disk, so that collision between the magnetic head and the magnetic disk and the like can be prevented. Thus, there can be obtained a head of improved reliability and stability, a head suspension assembly provided with the head, and a disk drive device.

The following is a description of magnetic heads of HDDs according to alternative embodiments of this invention.

According to a second embodiment shown in FIG. 14, a slider 42 includes a connecting step portion 79 that extends between a trailing step portion 58 and a maximum-positive-pressure producing step portion 70 along the first axial direction X and projects from a bottom surface of a negative-pressure chamber 54. The connecting step portion 79 is formed to be narrower than the maximum-positive-pressure producing step portion 70 and connects the respective central parts of the trailing step portion and the maximum-positive-pressure producing step portion.

Other configurations of the magnetic head 40 are the same as those of the foregoing first embodiment, so that like reference numbers are used to designate like portions, and a detailed description thereof is omitted.

Although the connecting step portion 79 causes the maximum-positive-pressure producing position to move toward the outflow-side end, according to the second embodiment, an effect can be expected such that the flying height increases as the recording and reproducing elements are caused to project by heat. Thus, suppression of change of a flying margin attributable to temperature change can be reconciled with suppression of the flight reduction over the DTR magnetic disk surface.

According to a third embodiment shown in FIG. 15, a slider is not provided with any center step portions and includes a pair of sidestep portions 76 that are disposed individually on the opposite sides of the central axis of the slider. The area of the top surface of each sidestep portion 76 is sufficiently greater than that of a trailing step portion 58. Thus, a maximum positive pressure of the slider is produced at each sidestep portion 76, and each sidestep portion constitutes a maximum-positive-pressure producing step portion. Each sidestep portion 76 includes a maximum-positive-pressure producing part F that is shifted from the location of recording and reproducing elements 45 toward the inflow end side of the slider 42.

According to a fourth embodiment shown in FIG. 16, a slit 76a that extends parallel to the central axis of a slider is formed in the top surface of each sidestep portion 76 so that the intake of air is increased. Thus, the pressure producing efficiency is enhanced, whereby the flight stability of the slider is improved. Other configurations of a magnetic head 40 are the same as those of the foregoing third embodiment, so that like reference numbers are used to designate like portions, and a detailed description thereof is omitted.

According to a fifth embodiment shown in FIG. 17, a maximum-positive-pressure producing step portion 70 integrally includes a connecting step portion 79 extending to a trailing step portion 58, a projecting portion 78 extending toward the inflow end, a pair of recesses 70a formed individually on the opposite sides of the projecting portion with the central axis of a slider 30 between them. According to this arrangement, a maximum positive pressure can be produced at those two parts F of the maximum-positive-pressure producing step portion 70 which are situated on the downstream side of the recesses 70a, and the temperature-dependent flying margin can be equalized without failing to try to obtain an effect of flight reduction suppression.

According to a sixth embodiment shown in FIG. 18, a maximum-positive-pressure producing step portion 70 is formed as an E-shaped step portion that includes a pair of recesses 70a. Since the maximum-positive-pressure producing step portion 70 is thus E-shaped, more air can be introduced through the recesses 70a, so that a pressure produced at the maximum-positive-pressure producing parts F can be increased to ensure higher flight stability.

Figure 19:
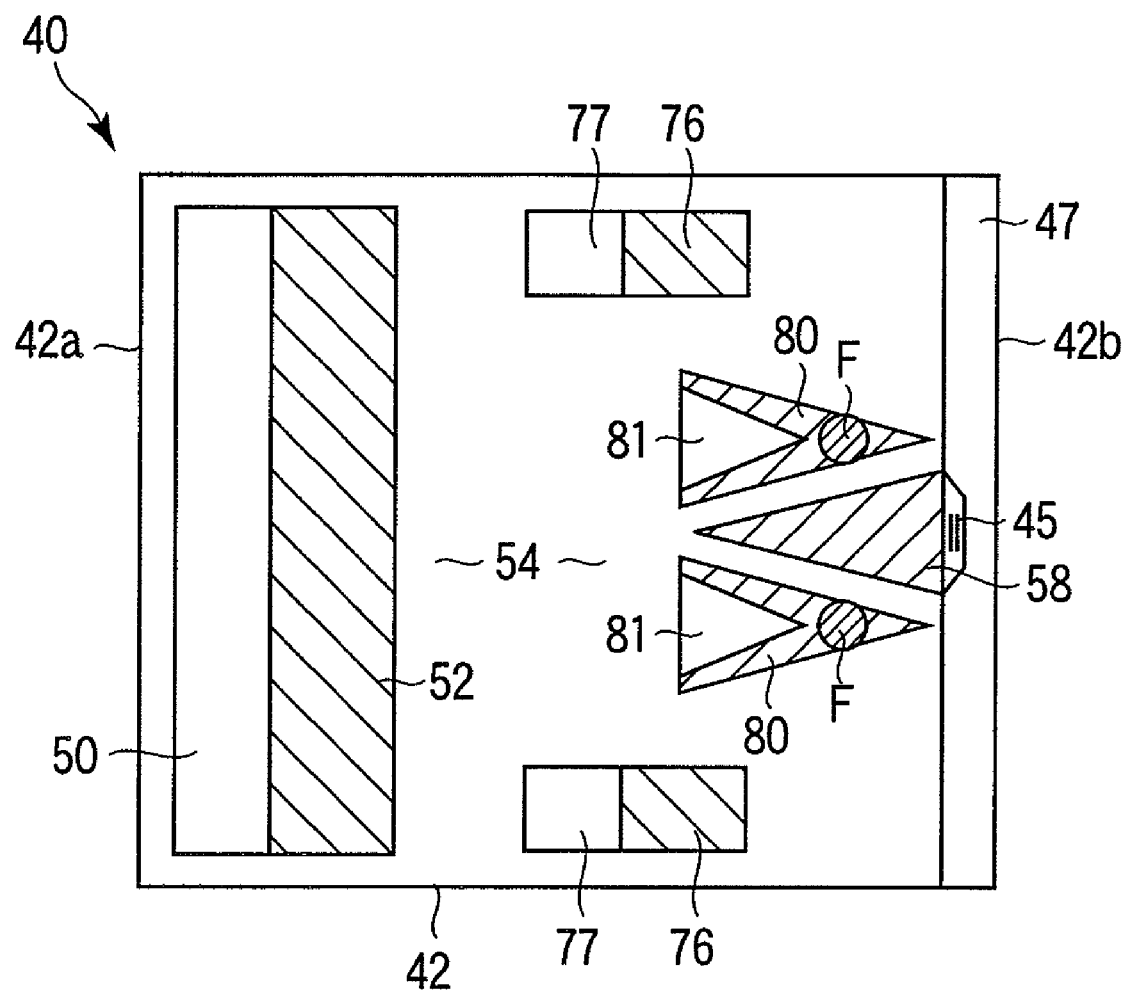
FIG. 19 is an exemplary plan view showing the disk-facing surface side of a magnetic head according to a seventh embodiment of this invention.

According to a seventh embodiment shown in FIG. 19, a trailing step portion 58 is in the form of a triangle that is convex on the inflow end side of a slider 42, and two inverted-V-shaped maximum-positive-pressure producing step portions 80 are formed individually on the opposite sides of the trailing step portion 58 with gaps between them. Each maximum-positive-pressure producing step portion 80 is formed with a recess 81 that opens on the inflow end side of the slider 42.

In the two maximum-positive-pressure producing step portions 80, maximum-positive-pressure producing parts F are situated apart from recording and reproducing elements 45 on the inflow end side of the slider. As in the foregoing embodiments, therefore, the flight reduction of a magnetic head over the DTR magnetic disk can be suppressed. Further, the recesses 81 are formed in the maximum-positive-pressure producing step portions 80 and used as air inlets, so that the flight stability of the slider can be secured appropriately.

In each of the fifth, sixth, and seventh embodiments described above, other configurations of the magnetic head are the same as those of the foregoing first embodiment, so that like reference numbers are used to designate like portions, and a detailed description thereof is omitted.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The shapes, dimensions, etc., of the leading step portion, trailing step portion, and maximum-positive-pressure producing step portion are not limited to the embodiments described herein but may be varied as required.

What is claimed is:

1. A head configured to perform information processing for a rotatable recording medium, the head comprising:
   a slider comprising a facing surface opposite to a surface of the recording medium, and configured to fly by an airflow between the recording medium surface and the facing surface as the recording medium rotates; and
   a head portion on the slider configured to record to the recording medium and to reproduce information from the recording medium,
   wherein the facing surface of the slider comprises:
      an inflow-side end and an outflow-side end for the airflow,
      a first axis extending between the inflow end and the outflow-side end in the direction of the airflow, and
      a second axis extending at right angles to the first axis, the slider comprises:
      a negative-pressure cavity defined by a recess in the facing surface and configured to produce a negative pressure,
      a leading step portion on an upstream side of the negative-pressure cavity with respect to the airflow projecting from a bottom surface of the negative-pressure cavity as a first portion of the facing surface,
      a trailing step portion on the outflow-side end portion and on the first axis of the facing surface on an downstream side of the negative-pressure cavity with respect to the airflow projecting from the bottom surface of the negative-pressure cavity as a second portion of the facing surface,
      a maximum-positive-pressure producing step portion on the first axis of the facing surface, spaced upstream from the trailing step portion with respect to the airflow by a distance equal to 2 to 50% of a length of the slider along the first axis, projecting from the bottom surface of the negative-pressure cavity configured to produce a maximum positive pressure,
      a groove between the trailing step portion and the maximum-positive-pressure producing step portion, and
      a connecting step portion between the trailing step portion and the maximum-positive-pressure producing step portion extending along the first axis and projecting from the bottom surface of the negative-pressure chamber, configured to connect central portions of the trailing step portion and the maximum-positive-pressure producing step portion, and the head portion is on the trailing step portion.

2. The head of claim 1, wherein the trailing step portion is on the first axis of the facing surface and the maximumpositive-pressure producing step portion comprises a pair of sidestep portions on the opposite sides of the first axis projecting from the bottom surface of the negative-pressure chamber, the sidestep portions comprising a plane area larger than that of the trailing step portion.

3. The head of claim 2, wherein the slider comprises a slit on a top surface of each sidestep portion extending parallel to the first axis.

4. The head of claim 1, which further comprises a pair of sidestep portions on the opposite sides of the first axis projecting from the bottom surface of the negative-pressure cavity.

5. The head of claim 1, wherein the maximum-positive-pressure producing step portion comprises a pair of recesses on the opposite sides of the first axis.

6. The head of claim 1, wherein the slider comprises:
a pair of center step portions on the opposite sides of the first axis, projecting from the bottom surface of the negative-pressure cavity, and extending between the leading step portion and the maximum-positive-pressure producing step portion; and
a pair of sidestep portions on the opposite sides of the center step portions, projecting from the bottom surface of the negative-pressure cavity.

7. A head configured to perform information processing for a rotatable recording medium, the head comprising:
a slider comprising a facing surface opposite to a surface of the recording medium, and configured to fly by an airflow between the recording medium surface and the facing surface as the recording medium rotates; and
a head portion on the slider configured to record to the recording medium and to reproduce information from the recording medium,
wherein the facing surface of the slider comprises:
an inflow-side end and an outflow-side end for the airflow,
a first axis extending between the inflow end and the outflow-side end in the direction of the airflow, and
a second axis extending at right angles to the first axis, the slider comprises:
a negative-pressure cavity defined by a recess in the facing surface and configured to produce a negative pressure,
a leading step portion on an upstream side of the negative-pressure cavity with respect to the airflow projecting from a bottom surface of the negative-pressure cavity as a first portion of the facing surface,
a trailing step portion on the outflow-side end portion and on the first axis of the facing surface on an downstream side of the negative-pressure cavity with respect to the airflow projecting from the bottom surface of the negative-pressure cavity as a second portion of the facing surface,
a maximum-positive-pressure producing step portion on the first axis of the facing surface, spaced upstream from the trailing step portion with respect to the airflow by a distance equal to 2 to 50% of a length of the slider along the first axis, projecting from the bottom surface of the negative-pressure cavity configured to produce a maximum positive pressure,
a groove between the trailing step portion and the maximum-positive-pressure producing step portion, and
a pair of center step portions on the opposite sides of the first axis projecting from the bottom surface of the negative-pressure cavity and extending between the leading step portion and the maximum-positive-pressure producing step portion; and
a pair of sidestep portions projecting from the bottom surface of the negative-pressure cavity on the opposite sides of the center step portions, and the head portion is on the trailing step portion.

8. A head suspension assembly used in a disk drive device comprising a rotatable recording medium, which comprises a disk substrate, a recording area comprising a concave-convex pattern circumferentially extending on a surface of the substrate, and a plurality of servo areas comprising concave-convex patterns individually radially extending on the surface of the substrate configured to store servo data, and a drive module configured to support and rotate the recording medium, the head suspension assembly comprising:
a head comprising a slider comprising a facing surface opposite to a surface of the recording medium, configured to fly by an airflow between the recording medium surface and the facing surface as the recording medium rotates, and a head portion on the slider configured to record information to the recording medium and to reproduce information from the recording medium; and
a head suspension configured to support the head mobile with respect to the recording medium and to apply a head load directed toward the recording medium surface to the head,
wherein the facing surface of the slider comprises an inflow-side end and an outflow-side end for the airflow, a first axis extending between the inflow end and the outflow-side end in the direction of the airflow, and a second axis extending at right angles to the first axis,
the slider comprises a negative-pressure cavity defined by a recess in the facing surface and configured to produce a negative pressure, a leading step portion on the upstream side of the negative-pressure cavity with respect to the airflow projecting from a bottom surface of the negative-pressure cavity as a first portion of the facing surface, a trailing step portion on the outflow-side end portion and on the first axis of the facing surface on an downstream side of the negative-pressure cavity with respect to the airflow projecting from the bottom surface of the negative-pressure cavity as a second portion of the facing surface, a maximum-positive-pressure producing step portion on the first axis of the facing surface, spaced upstream from the trailing step portion with respect to the airflow by a distance equal to 2 to 50% of a length of the slider along the first axis, projecting from the bottom surface of the negative-pressure cavity configured to produce a maximum positive pressure, a groove between the trailing step portion and the maximum-positive-pressure producing step portion, and a connecting step portion between the trailing step portion and the maximum-positive-pressure producing step portion extending along the first axis and projecting from the bottom surface of the negative-pressure chamber, configured to connect central portions of the trailing step portion and the maximum-positive-pressure producing step portion, and
the head portion is on the trailing step portion.

9. A disk drive device comprising:
a disk recording medium;
a drive configured to support and rotate the recording medium; and
a head suspension assembly of claim 8.

* * * * *